United States Patent [19]

Kelsey et al.

[11] Patent Number: 5,600,656
[45] Date of Patent: Feb. 4, 1997

[54] REMOTE LOOPBACK APPARATUS AND METHOD FOR TELEPHONE LINE REPEATERS

[75] Inventors: Karl A. Kelsey; Romuald Bailey, both of Albuquerque, N.M.

[73] Assignee: Siemens Stromberg-Carlson, Boca Raton, Fla.

[21] Appl. No.: 548,160

[22] Filed: Oct. 25, 1995

Related U.S. Application Data

[63] Continuation of Ser. No. 75,201, Jun. 10, 1993.

[51] Int. Cl.[6] .................................................. G01R 31/28
[52] U.S. Cl. ........................................................ 371/20.2
[58] Field of Search .......................... 371/20.2; 370/13.1, 370/14, 15; 379/4, 5, 26, 27

[56] References Cited

U.S. PATENT DOCUMENTS

| | | | |
|---|---|---|---|
| 4,042,794 | 8/1977 | Lima et al. | 179/175.3 R |
| 4,402,075 | 8/1983 | Bargeton et al. | 370/15 |
| 4,710,924 | 12/1987 | Chum | 371/4 |
| 4,713,810 | 12/1987 | Chum | 371/4 |
| 4,742,518 | 5/1988 | Shedd | 371/22 |
| 4,939,747 | 7/1990 | Adler | 375/3.1 |
| 5,010,544 | 4/1991 | Chang et al. | 370/13.1 |
| 5,060,226 | 10/1991 | Gewin et al. | 370/15 |
| 5,339,307 | 8/1994 | Curtis | 370/13.1 |

*Primary Examiner*—Robert W. Beausoliel, Jr.
*Assistant Examiner*—Stephen C. Elmore
*Attorney, Agent, or Firm*—Joseph S. Codispoti

[57] ABSTRACT

A loopback enabled by an instruction and address code pair transmitted with the regular data stream affords a simplified fault location scheme for a T1 repeater span. By selecting unique addresses for each repeater using a predetermined frame sequence and by testing for logic error density, erroneous enablement is avoided.

36 Claims, 4 Drawing Sheets

REMOTE LOOPBACK APPARATUS AND METHOD FOR TELEPHONE LINE REPEATERS

CROSS-REFERENCE TO RELATED APPLICATION

This is a continuation of Ser. No. 08/075,201 filed Jun. 10. 1993.

FIELD OF THE INVENTION

This invention generally relates to telephone line repeaters. Specifically, the invention is directed to a method and apparatus for remote loopback testing of such repeaters.

BACKGROUND OF THE INVENTION

In a T1 telephone circuit, repeaters are located at intervals along the line to boost the signal. Collectively, these components comprise what is referred to as a span. Occasionally, individual repeaters may fail and some means of testing and locating a defective repeater is required.

Until now, elaborate analog circuitry and extra wiring was required to perform such testing. Such arrangements are costly. It would be useful to have a simplified and cost-effective method of accessing individual repeaters in a span so that tests could be run to check performance.

SUMMARY OF THE INVENTION

These and other objects are achieved by a remotely, addressable repeater for a T1 span that permits remote loopback testing. Each repeater typically has a pair of repeater modules, one for the transmit side and the other for the receive side. The repeater also has a loopback detector for sensing the receipt of an instruction code and repeater address transmitted in the normal data stream, i.e., as inchannel signals.

Upon receipt of the instruction code, the repeater loopback detector will look for its address in the bit stream. If it recognizes its own address, the loopback detector will instruct the repeater to initiate a loopback. Data is then routed through the repeater, from one side to the other, back to the originating station.

One advantage of the invention over previous analog fault location schemes is that no additional lines are required, reducing installation and maintenance costs. It also allows real-time analysis of the line and the repeaters from a remote site.

The invention uses unique address codes for each of the repeaters which when combined with any random sequence of bits will not result in a valid address, thus erroneously enabling a loopback detector. Also, any repeater in a span can be addressed.

Additionally, the loopback detector has a logic error density counter. By allowing a predetermined maximum logic error density for the instruction code and the repeater address, the system will maintain functional integrity in the face of a relatively high bit error rate. The logic error density counter also ensures that no superframe or extended superframe sequence could inadvertently enable the decoder.

BRIEF DESCRIPTION OF THE DRAWINGS

A more complete understanding of the present invention, as well as other objects and advantages thereof not enumerated herein, will become apparent upon consideration of the following detailed description and the accompanying drawings, wherein.

DETAILED DESCRIPTION OF THE INVENTION

Figure 1:
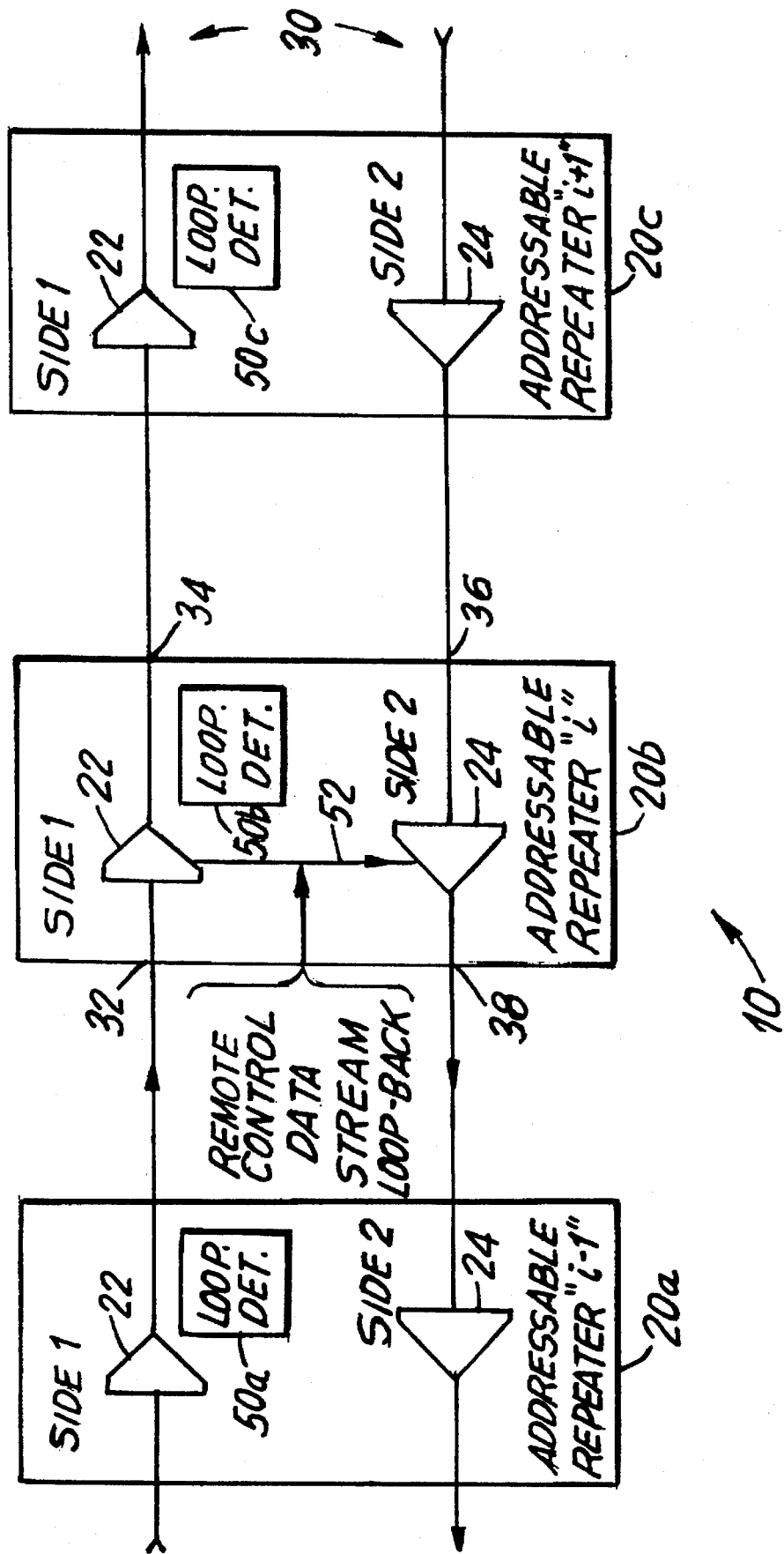
FIG. 1 is a schematic block diagram of a portion of a T1 repeater span.

A portion of a T1 repeater span 10 is shown in FIG. 1. The span 10 has several repeaters i−1, i, and i+1 20a, b, and c positioned at intervals on a T1 transmission line 30. Each repeater 20 has two repeater modules 22 and 24, one being arbitrarily designated the side 1 repeater module 22 and the other being designated the side 2 repeater module 24. At each repeater 20, the segment of the transmission line 30 entering the repeater 20 on side 1 is designated the receive input line 32 while the line leaving the repeater 20 on that side is designated the transmit output line 34. Similarly, the segment of the transmission line 30 entering the repeater 20 on side 2 is designated the receive input line 36 while the line leaving the repeater 20 on the same side is designated the transmit output line 38.

In addition, each repeater 20a, b, and c has a loopback detector 50a, b, and c. When the loopback detector 50 is properly enabled in one of the repeaters 20, the loopback detector 50 enables a loopback path 52 between the two repeater modules 22 and 24.

Figure 2:
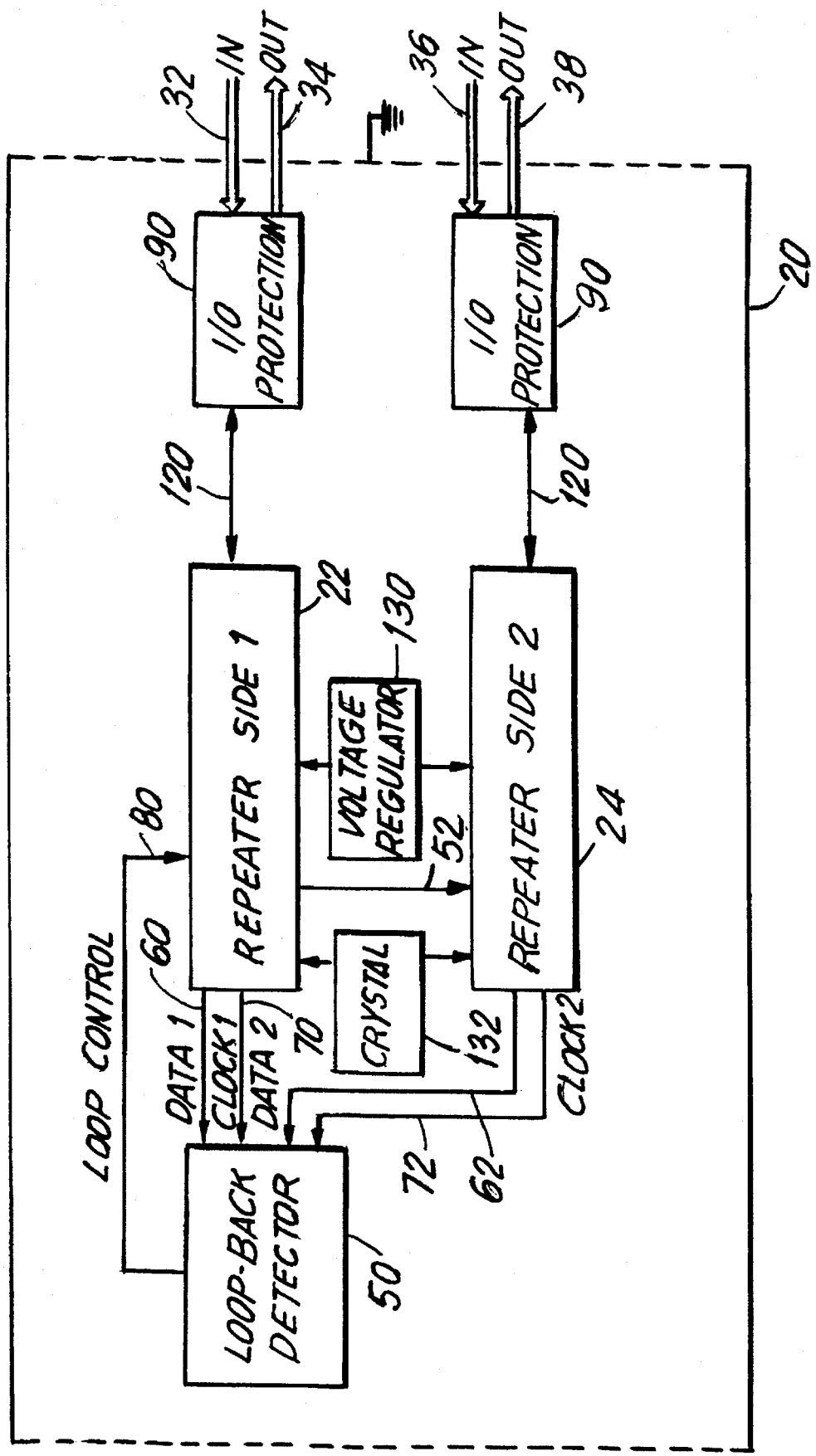
FIG. 2 is a schematic block diagram of a T1 repeater.

The repeater 20 is shown in greater detail in the block diagram of FIG. 2. The repeater modules 22 and 24 are connected to the loopback detector 50 by data lines data1 60 and data2 62 and clock lines clock1 70 and clock2 72, respectively. A loopback control line 80 carries the loopback command from the loopback detector 50 to the side 1 repeater module 22.

Normally, the loopback detector 50 receives the data from the data1 line 60. However, when a loopback 52 is enabled, it should be understood that the repeater module 22 in this configuration does not pass the input signal on to the next repeater 20 in the span. Therefore, the loopback detector 50 must pick up data from the data2 line 62. To accomplish this, the loopback detector 50 is selectively connected to both of the data lines data1 60 and data2 62, as will be explained below.

Each repeater module 22 and 24 is provided with a conventional I/O protection module 90. The I/O protection module 90 for the side 1 repeater module 22 is connected to the receive input line 32 and the transmit output line 34. Similarly, the I/O protection module 90 for the side 2 repeater module 24 is connected to the receive input line 36 and the transmit output line 38. Each I/O protection module 90 is connected to its respective repeater module 22 or 24 by an internal I/O line pair 120.

The repeater 20 also has a voltage regulator 130 and a clock crystal 132. The voltage regulator 130 provides supply voltage to the repeater modules 22 and 24, and the loopback detector 50 (connection not shown). The crystal 132 serves as a reference for each module's 22 and 24 internal clock (not shown).

The Loopback Detector

Figure 3:
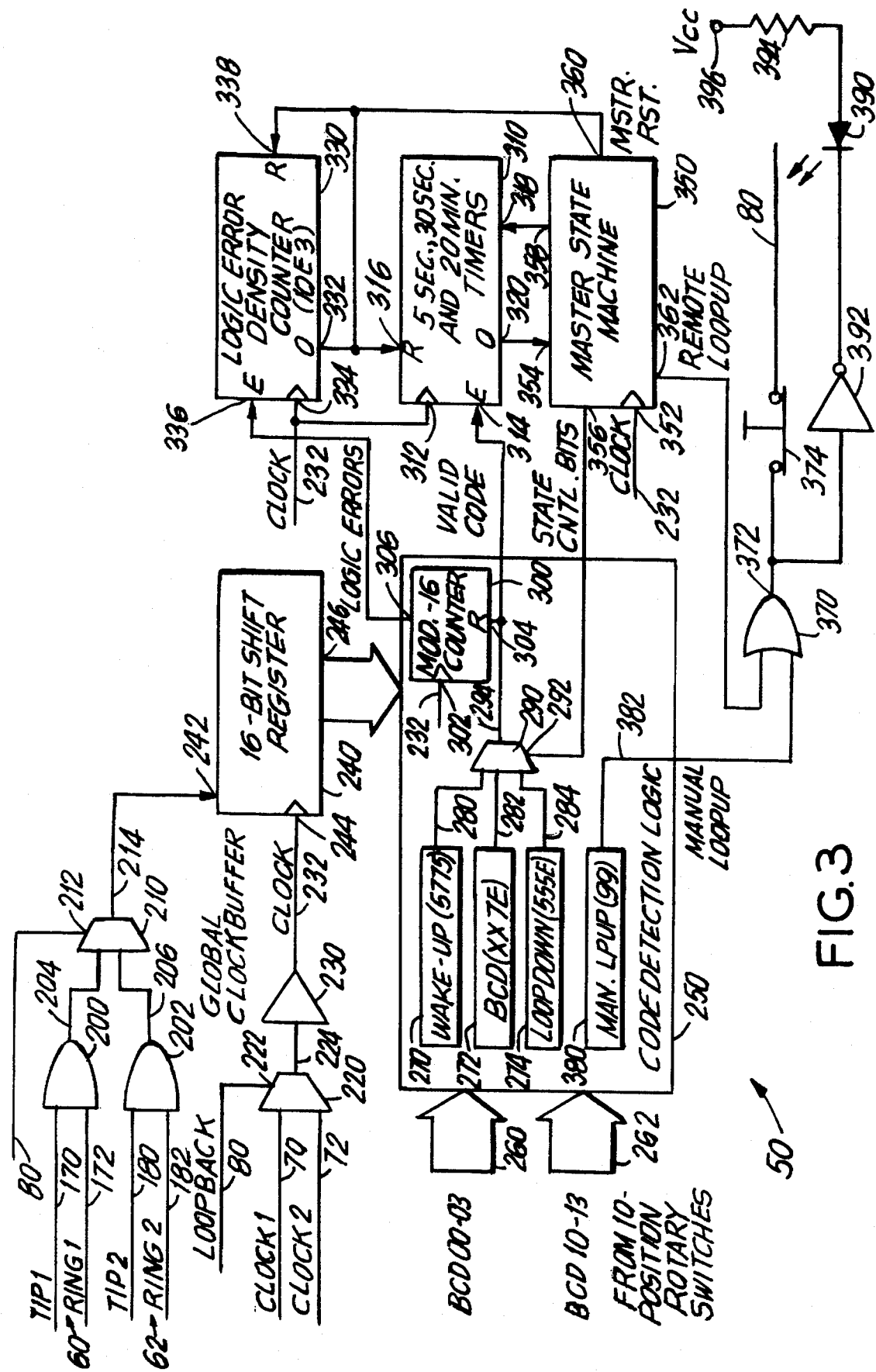
FIG. 3 is a schematic block diagram of a loopback detector.

A block schematic diagram of the loopback detector 50 is shown in FIG. 3. As shown in the previous figure, the loopback detector 50 is connected to the two data lines data1 60 and data2 62. The data1 line 60 connected to the side 1 repeater module 22 has a tip1 line 170 and a ring1 line 172; the data2 line 62 connected to the side 2 repeater module 24 has a tip2 line 180 and a ring2 line 182. Similarly, there are the two clock lines clock1 70 and clock2 72 from the respective repeater modules 22 and 24.

Tip1 170 and ring1 172 lines are provided to an AND-gate 200 and tip2 180 and ring2 182 lines are provided to an AND-gate 202. The respective outputs 204 and 206 of the AND-gates 200 and 202 form the inputs to a 2:1 data multiplexer 210, which has a control input 212 and an output 214.

Clock1 70 and clock2 72 lines form the inputs to a 2:1 clock multiplexer 220, which has a control input 222 and an output 224. The multiplexer output 224 feeds a global clock buffer 230, which has an output 232.

The data received on data lines 60 and 62 is selectively funnelled by the data multiplexer 210 through a 16-bit shift register 240. The shift register 240 has a data input 242, a clock input 244, and a 16-bit parallel data output 246. The data input 242 is connected to the output 214 of the data multiplexer 210 and the clock input 244 is connected to the output 232 of the global clock buffer 230.

The 16-bit parallel data output 246 of the shift register 240 is connected to a code detection logic module 250. The logic module 250 performs the actual decoding of the messages received on the data lines 60 and 62.

In addition to the 16-bit parallel data output 246 of the shift register 240, the logic module 250 has inputs 260 and 262 from two 10-position rotary switches (not shown) for setting and registering the address of the repeater 20. With two such inputs, there can be a total of 99 repeaters (i.e., 0–98; 99 is reserved for manual override as explained below); this number can be increased by providing additional inputs and switches.

There are three code detectors 270, 272, and 274 in the logic module 250, which search the incoming data for the wake-up (5775H), address (XX7EH), and loopdown (555EH) commands, respectively. If any of the code detectors 270, 272, or 274 detect a valid sequence, they will issue a valid code signal on their respective outputs 280, 282, and 284. These outputs 280, 282, and 284 are provided to a code detector multiplexer 290. The multiplexer 290 has a control input 292 and a data output 294.

The codes have been selected to provide unique sequences to avoid erroneous triggering. Each code is contained in a 16-bit frame. In the case of the address code, the framing bits are 7EH, which contains six sequential 1s.

The logic module 250 also has a modulo-16 counter 300, which has a clock input 302, a reset input 304, and a data output 306. The clock input 302 is taken from the global clock buffer output 232 and the reset signal is provided by the output 294 of the code detector multiplexer 290.

If a valid code is received, the counter 300 is reset and a valid code signal is passed on by the multiplexer 290. If a valid code is not received, the counter 300 will reach its maximum count and its data output 306 will go high.

The output 294 of the code detector multiplexer 290 is used to enable a timer module 310, which has a clock input 312, an initialization port 314, a reset port 316, a timing state input 318, and an output 320. The clock input 312 is taken from the global clock buffer output 232. The initialization port 314 is connected to the output 294 of the code detector multiplexer 290.

The timer module 310 has the ability to count over three different time intervals (5 seconds, 30 seconds, and 20 minutes) individually and collectively selectable by providing the proper signal to the timing state input 318. As will be explained below in connection with the operation of the loopback detector 50, the timer module 31.0 in one instance is simultaneously counting 5 and 30 second periods, with independent resets. If desired, the timer module 310 can be implemented as independent state machines.

A logic error density counter 330 provides an error density signal at an error output port 332 which in turn is connected to the reset port 316 of the timer module 310. The error density counter 330 has a clock input 334 and a data input 336, the latter being connected to the data output 306 of the modulo-16 counter 300. The error density counter 330 also has a reset port 338.

Figure 4:
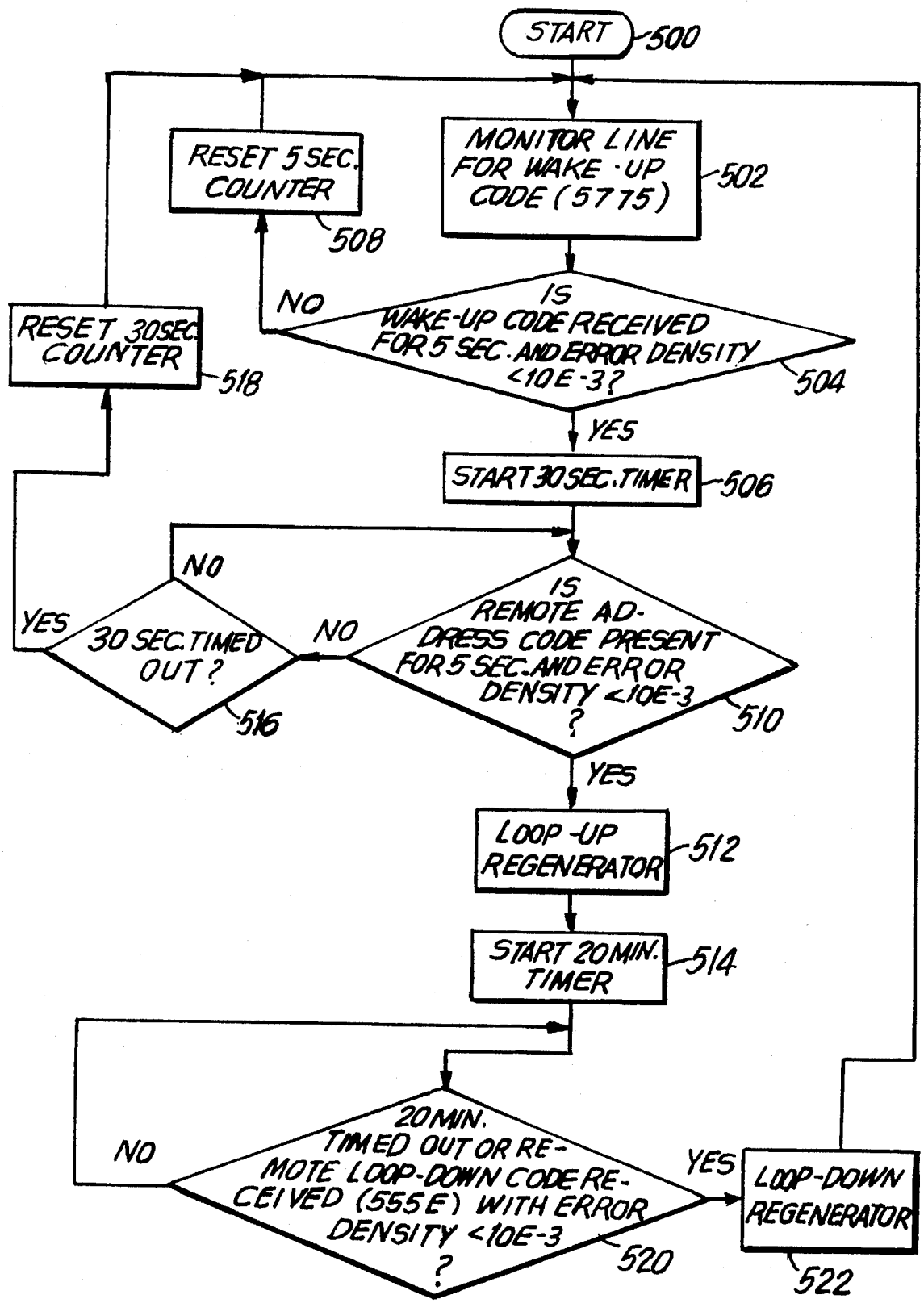
FIG. 4 is a flow chart of the operation of the loopback detector.

For control, the loopback detector 50 has a master state machine 350, which is programmed to function in accordance with the flow chart of FIG. 4. The state machine 350 is clocked at a clock input 352 and receives an input at an input port 354.

The state machine 350 issues state control bits to the code detector multiplexer 290 at a state output 356 and state enablement signals to the timer module 310 at a state enablement output 358. Also, the state machine 350 issues master reset signals at a master reset port 360, which is connected to the reset ports 316 and 338 of the timer module 310 and the error density counter 330, respectively. Finally, the state machine 350 has a remote loopup output 362 which is provided to an OR-gate 370 along with the output 382 of a manual loopup code detector 380. This latter detector is connected to the inputs 260 and 262 from the two 10-position rotary switches, and is enabled when the switches are set to 99. (It should be understood that a setting other than 99 could be used.)

The output 372 of the OR-gate 370 provides the loopup signal 80 to the side 1 repeater module 22 to initiate a loopup. This signal is also provided to the control input 212 of the data multiplexer 210 and the control input 222 of the clock multiplexer 220. It can also be used to enable a loopup LED 390 through an inverter 392. The LED 390 is connected to a pull-up resistor 394 which in turn is connected to $V_{cc}$ 396.

For manual override enabling a loopback, the ten-position rotary switches are set to 99, enabling OR-gate 370. To manually disable the loopback detector 50, a switch 374 will disengage the output 372 of the OR-gate 370.

The loopback controller 50 can be implemented in a field programmable gate array ("FPGA"), which is configured by the user to provide the logic functions desired. In the embodiment under discussion, Xilinx 3000 family of FPGAs, available from Xilinx, 2100 Logic Drive, San Jose, Calif., were used. These components, as well as the methods for configuring and programming them, are described in detail in the 1992 Xilinx Programmable Gate Array Databook. Of course, one could use dedicated logic chips or other suitable devices.

Operation of the Loopback Detector

The operation of the loopback detector 50 will now be discussed with reference to the flow chart of FIG. 4. The number in parentheses refer to the blocks of the flow chart.

At the start (500), the loopback detector 50 is monitoring the incoming data line 60 for the codes that would signal a loopback operation. The first code that the detector 50 looks for is the wake-up code 5775H (502). If the wake-up code is received, the timer module 310 checks to see if the code is sustained for a period of at least 5 seconds and that the error density is no greater than one error in a thousand (504). If so, the timer module 310 is directed by the master state machine 350 to commence a 30 second timing period (506).

Should the wake-up code not be present for the minimum 5 second period, the modulo-16 counter 300 will reach a maximum count, triggering a logic error and if the logic error density exceeds one error in a thousand, the timer module 310 will be reset by the output 332 of the logic error density counter 330 (508). The sequence then starts anew (502).

During the 30-second timing period, the loopback detector 50 looks for a valid address code XX7EH for a sustained period of at least 5 seconds and an error density of not greater than one error in a thousand (510). If these two conditions are satisfied, the master state machine 350 will issue a loopup command to the side I repeater module 22 (512). This will in turn trigger the start of a 20 minute timing period (514).

Should the address code not be present for the minimum 5 second period, the modulo-16 counter 300 will again reach a maximum count triggering a logic error which is passed on by the logic error density counter 330 to the timer module 310 as a reset command (510). The detector 50 will keep checking for a valid address code for the minimum 5 second period, until the 30 second period is exhausted (516). At that point, the timer module 310 is reset (518), and the detector 50 begins looking for another wake-up code (502).

Once in the loopback mode, the loopback detector 50 will await receipt of the loopdown code 555EH on the side 2 data line 62 (520). If the loopdown code is received for the minimum time period with the required maximum error density, then the loopback is disabled (522) and the loopback detector 50 resumes its search for the wake-up code (502). If the period of 20 minutes elapses before the loopdown code is received, the detector 50 will disable the loopback on its own (522).

While there has been described what is believed to be the preferred embodiment of the invention, those skilled in the art will recognize that other and further modifications may be made thereto without departing from the spirit of the invention, and it is intended to claim all such embodiments that fall within the true scope of the invention. For example, the codes and their associated word lengths employed are arbitrary—others could have been selected. Also, the timing periods and permissible error densities are arbitrary.

What is claimed is:

1. A repeater having a unique address designation, comprising:

means, responsive to inchannel signals, for detecting at least one inchannel code sequence, where at least one inchannel code sequence is representative of the unique address designation; and means, responsive to the means for detecting, for initiating a loopback in the repeater.

2. A repeater as set forth in claim 1, wherein the means for detecting comprises means for timing the duration of the detected code sequence and means, responsive to the means for timing, for validating the detected code sequence, and wherein the means for initiating a loopback is responsive to the means for validating.

3. A repeater as set forth in claim 1, wherein the means for detecting comprises means for detecting errors in the detected code sequence.

4. A repeater as set forth in claim 3, wherein the means for detecting errors comprises means for determining error density.

5. A repeater as set forth in claim 3, further comprising means, responsive to the means for detecting errors, for determining whether the detected code sequence is valid.

6. A repeater as set forth in claim 1, wherein the means for detecting comprises:

means for timing the duration of the detected code sequence;

means for detecting errors in the detected code sequence; and means, responsive to the means for timing and the means for detecting errors, for determining whether the detected code sequence is valid.

7. A repeater as set forth in claim 1, wherein the means for detecting comprises:

first detection means, responsive to inchannel signals, for detecting a first inchannel code sequence, the first inchannel code sequence being representative of an enabling command; and second detection means, responsive to inchannel signals, for detecting a second inchannel code sequence, the second inchannel code sequence being representative of the unique address designation.

8. A repeater as set forth in claim 7, wherein the means for detecting further comprises third detection means for detecting a third inchannel code sequence, the third inchannel code sequence being representative of a disabling command and wherein the repeater further comprises means, responsive to the third detection means, for disabling the loopback.

9. An apparatus for initiating a loopback in a remotely-addressable repeater on a transmission line, the repeater having a unique address designation and being responsive to inchannel signals, comprising:

at least one means, responsive to the inchannel signals, for detecting at least one inchannel code sequence, where at least one inchannel code sequence is representative of the unique address designation; and means, responsive to the means for detecting, for initiating a loopback in the repeater.

10. An apparatus as set forth in claim 9, wherein the means for detecting comprises means for timing the duration of the detected code sequence and means, responsive to the means for timing, for validating the detected code sequence, and wherein the means for initiating a loopback is responsive to the means for validating.

11. An apparatus as set forth in claim 9, wherein the means for detecting comprises means for detecting errors in the detected code sequence.

12. An apparatus as set forth in claim 9, wherein the means for detecting errors comprises means for determining error density.

13. An apparatus as set forth in claim 11, further comprising means, responsive to the means for detecting errors, for determining whether the detected code sequence is valid.

14. An apparatus as set forth in claim 9, wherein the means for detecting comprises:

means for timing the duration of the detected code sequence;

means for detecting errors in the detected code sequence; and means, responsive to the means for timing and the means for detecting errors, for determining whether the detected code sequence is valid.

15. An apparatus as set forth in claim 9, wherein the means for detecting further comprises:

first detection means, responsive to the inchannel signals, for detecting a first inchannel code sequence, the first inchannel code sequence being representative of an enabling command; and second detection means, responsive to the inchannel signals, for detecting a second inchannel code sequence, the second inchannel code sequence being representative of the unique address designation.

16. An apparatus as set forth in claim 15, wherein the means for detecting further comprises third detection means for detecting a third inchannel code sequence, the third inchannel code sequence being representative of a disabling command and wherein the apparatus further comprises means, responsive to the third detection means, for disabling the loopback.

17. A system for conveying signals, comprising:

first path means for conveying signals;

second path means for conveying signals;

a plurality of remotely addressable means for repeating, each means for repeating having a unique address designation and being connected to the first and second path means, and comprising:

means, responsive to inchannel signals for detecting at least one inchannel code sequence, where at least one inchannel code sequence is representative of the unique address designation; and means, responsive to the means for detecting, for transferring a signal received on one of the path means to the other of the path means through the means for repeating.

18. A system as set forth in claim 17, wherein the means for detecting comprises means for timing the duration of the detected code sequence and means, responsive to the means for timing, for validating the detected code sequence, and wherein the means for initiating a loopback is responsive to the means for validating.

19. A system as set forth in claim 17, wherein the means for detecting comprises means for detecting errors in the detected code sequence.

20. A system as set forth in claim 19, wherein the means for detecting errors comprises means for determining error density.

21. A system as set forth in claim 19, further comprising means, responsive to the means for detecting errors, for determining whether the detected code sequence is valid.

22. A system as set forth in claim 17, wherein the means for detecting comprises:

means for timing the duration of the detected code sequence;

means for detecting errors in the detected code sequence; and means, responsive to the means for timing and the means for detecting errors, for determining whether the detected code sequence is valid.

23. A system as set forth in claim 17, wherein the means for detecting comprises:

first detection means, responsive to inchannel signals, for detecting a first code sequence, where the first code sequence is representative of an enabling command;

means, responsive to the first detection means, for enabling the detection of a second code sequence, the second code sequence being representative of the unique address designation; and second detection means, responsive to the means for enabling the detection of a second code sequence, for detecting the second code sequence.

24. A system as set forth in claim 23, wherein the means for detecting further comprises third detection means for detecting a third inchannel code sequence, the third inchannel code sequence being representative of a disabling command and wherein the repeater further comprises means, responsive to the third detection means, for disabling the loopback.

25. A method for initiating a loopback in response to inchannel signals in a repeater system comprising a plurality of repeaters distributed along a transmission line of first and second data lines, where each repeater has a unique address designation and the repeater has a pair of repeater modules, each repeater having a selectively-enabled loopback path for interconnecting the pair of repeater modules independently of the data lines, comprising the steps of:

detecting at least one inchannel code sequence, where at least one inchannel code sequence is representative of the unique address designations; and in response to the detection of the inchannel code sequence, initiating a loopback in the repeater.

26. A method as set forth in claim 25, further comprising the step of timing the duration of the detected code sequence and, in response to the step of timing, validating the detected code sequence, and wherein the step of issuing a loopback command is further in response to the step of validating.

27. A method as set forth in claim 25, further comprising the step of detecting errors in a detected code sequence.

28. A method as set forth in claim 27, wherein the step of detecting errors comprises the step of determining error density.

29. A method as set forth in claim 27, further comprising the step, in response to the step of detecting errors, of determining whether the detected code sequence is valid.

30. A method as set forth in claim 25, further comprising the steps of:

timing the duration of the detected code sequence;

detecting errors in the detected code sequence; and in response to the steps of timing and detecting errors, determining whether the detected code sequence is valid.

31. A method as set forth in claim 25, wherein the step of detecting at least one code sequence comprises the steps of:

detecting a first inchannel code sequence, the first inchannel code sequence being representative of an enabling command; and detecting a second inchannel code sequence, the second inchannel code sequence being representative of the unique address designations.

32. A method as set forth in claim 31, wherein the step of detecting at least one code sequence further comprises the step of detecting a third inchannel code sequence, the third inchannel code sequence being representative of a disabling command and the method for initiating a loopback further comprises the step of disabling the loopback in response to the step of detecting a third inchannel code sequence.

33. A system for conveying signals, comprising:

a transmission line comprising first and second data lines; and a plurality of remotely addressable repeaters connected to the transmission line, each repeater having a unique address designation and comprising:

a pair of repeater modules;

a detector, connected to the repeater modules, for detecting at least one inchannel code sequence, where at least one inchannel code sequence is representative of the unique address designation of the repeater; and a loop-back switch, responsive to the detector, for interconnecting the repeater modules of the repeater independently of the transmission line.

34. A system as set forth in claim 33, further comprising:

a timer for timing the duration of the detected inchannel code sequences;

an error detector for detecting errors and error density in the detected inchannel code sequence; and decision means, responsive to the timer and error detector, for deciding whether the detected code sequence is valid.

35. A system as set forth in claim 33, where the detector comprises:

a first code sequence detector for detecting an inchannel code sequence representative of an enabling command; and a second code sequence detector for detecting an inchannel code sequence representative of the unique address designation of the repeater.

36. A system as set forth in claim 35, further comprising a third detector for detecting an inchannel code sequence representative of a disabling command, where the loop-back switch is responsive to the third detector.

* * * * *